United States Patent [19]

Takimoto et al.

[11] Patent Number: 4,599,376

[45] Date of Patent: Jul. 8, 1986

[54] POLYVINYL CHLORIDE COMPOSITION

[75] Inventors: Masahiro Takimoto; Satoshi Ota; Yoshio Yamazaki, all of Aichi, Japan

[73] Assignee: Toyoda Gosei Kabushiki Kaisha, Nishikasugai, Japan

[21] Appl. No.: 715,944

[22] Filed: Mar. 25, 1985

[30] Foreign Application Priority Data

Mar. 28, 1984 [JP]  Japan .................................. 59-58504

[51] Int. Cl.$^4$ .............................................. C08K 3/08
[52] U.S. Cl. .................................... 524/441; 524/567
[58] Field of Search ................................ 524/441, 567

[56] References Cited

U.S. PATENT DOCUMENTS

| | | |
|---|---|---|
| 3,708,318 | 1/1973 | Reinhart et al. ................... 524/441 |
| 4,104,432 | 8/1978 | Manabe et al. . |
| 4,214,016 | 7/1980 | Manabe et al. . |
| 4,292,087 | 9/1981 | Bell ..................................... 524/441 |
| 4,369,225 | 1/1983 | Manabe et al. . |
| 4,442,167 | 4/1984 | Iwasa et al. . |
| 4,490,283 | 12/1984 | Kleiner ............................... 524/441 |

*Primary Examiner*—Herbert J. Lilling
*Attorney, Agent, or Firm*—Cushman, Darby & Cushman

[57] ABSTRACT

A polyvinyl chloride composition comprising polyvinyl chloride having dispersed therein platelet aluminum powders, characterized in that the aluminum powders have a diameter of at least 10μ and are used in an amount of 0.2-10 parts by weight per 100 parts by weight of the polyvinyl chloride. This composition affords by molding a weather-resisting resinous molded article of metallic luster in appearance.

4 Claims, No Drawings

POLYVINYL CHLORIDE COMPOSITION

BACKGROUND OF THE INVENTION

1. Field of the Invention

The present invention relates to a polyvinyl chloride composition containing aluminum powders which affords by molding a weather-resisting resinous molded article of metallic luster in appearance. More particularly, the present invention relates to a moldable polyvinyl chloride composition containing platelet aluminum powders of a specific size in a specific proportion which affords by molding a weather-resisting molded article of metallic luster in appearance.

2. Related Art Statement

From the past, a surface treatment such as plating, vapor deposition, sputtering or painting is put into practice as a means for imparting metallic luster to molded articles made of resinous materials such as polyvinyl chloride, ABS resin and acrylic resin. Typical methods recently developed as such surface treatment are disclosed, for example, in U.S. Pat. Nos. 4,104,432, 4,214,016, 4,369,225 and 4,442,167. According to these prior arts, a molded resinous article is generally overlaid successively with a base coat, a thin metallic film and a protective top coat. In this case, the thin metallic film is applied onto the surface of the base coat by vapor deposition or sputtering.

Besides these surface treatments, incorporation of a powdery metal into resinous materials followed by molding of the resinous materials, for example, by extrusion is also put into practice as another means for imparting metallic luster to molded articles.

Among these means for furnishing resinous articles with metallic feeling and appearance, the firstly mentioned surface treatment of a resinous article by sputtering, ion plating or the like means provides a lustrously metallized resinous product with an excellent metallic appearance and durability and is thus recommended as the most preferable means at present. However, such surface treatment requires a series of complicate steps, especially a tremendous metallizing step for molded resinous articles in a complicate shape, so that the cost for manufacturing the products becomes higher. Because of affording a high quality metallized products, such metallizing treatment is commercially attractive for manufacturing relatively expensive goods but is not economical for manufacturing low cost products of general use.

On the other hand, the latter mentioned method comprising incorporation of metal powders into a moldable resinous material is econmically advantageous since a molded resinous product with metallic appearance can be obtained simply by molding the material, for example, by injection molding, extrusion, calendering or blow molding. As the metal powders have homogeneously been dispersed in the resinous material, there is no fear of delamination of a metal film unlike the case of the metallization of molded articles. For these reasons, this method is now widely utilized for manufacturing toys and low cost daily necessaries where severe resisting properties are not required. From the economical point of view, metal powders to be incorporated into a moldable resinous material are aluminum powders.

In case of various outdoor parts used for motor vehicles and houses, which are exposed under severe weathering action for a long period of time, the products with metallic appearance obtained by the latter mentioned method are found inferior in weather-resisting property. Among various resinous materials, polyvinyl chloride for which a soft type resin or a hard type resin is commercially available is widely employed for exterior parts of motor vehicles and houses because of its good weather-resisting property and low cost. In case of polyvinyl chloride, too, however, its weather-resisting property is significantly deteriorated when this resin is incorporated with aluminum powders. A polyvinyl chloride composition having been incorporated with aluminum powders forms black spots or tends to lose its lustrously metallic appearance during its use as exterior resinous goods by the influence of ultraviolet rays or rain. Thus, even polyvinyl chloride is unsuited as a resinous material containing aluminum powders from which exterior parts are manufactured.

Hence, there is a great demand for developing a moldable polyvinyl chloride composition having been incorporated with aluminum powders which can easily be molded to afford a molded polyvinyl chloride article having lustrously metallic appearance with noble feeling and having excellent resistance to weathering action.

BRIEF SUMMARY OF THE INVENTION

Accordingly, it is an object of the present invention to provide a moldable polyvinyl chloride composition having been incorporated with aluminum powders of a specific size in a specific proportion.

It is another object of the present invention to provide a moldable polyvinyl chloride composition which affords by molding a molded polyvinyl chloride article having lustrously metallic appearance and excellent resistance to weathering action.

It is still another object of the present invention to provide a lustrously metallized resinous article suitable as exterior parts for motor vehicles and houses.

Other and further objects, features and advantages of the present invention will become apparent more fully from the following description.

DETAILED DESCRIPTION OF THE INVENTION

As a result of extensive researches made on the nature and proportion of polyvinyl chloride and aluminum powders of a moldable resinous composition for enhancing the weather-resisting property of a molded article obtainable therefrom, it has now been found surprisingly that a moldable polyvinyl chloride composition capable of affording by molding a polyvinyl chloride article having metallic appearance and excellent resistance to weathering action can be obtained when aluminum powders of a specific size are incorporated in a specific proportion into the polyvinyl chloride composition.

In accordance with the present invention, there is provided a polyvinyl chloride composition comprising polyvinyl chloride having dispersed therein platelet aluminum powders, characterized in that the aluminum powders have a diameter of at least 10μ and are used in an amount of 0.2–10 parts by weight per 100 parts by weight of the polyvinyl chloride.

Polyvinyl chloride is one of the most popular thermoplastic resins and is commercially available in various types. In the present invention, various types of polyvinyl chloride (polymerization degree: 800–1800 in average) can equivalently be used. In case a hard type resinous material is desired, such polyvinyl chloride is employed as such. Generally, however, the resin is blended with a plasticizer, a stabilizer and other additives such as pigments and fillers to form a soft type resin. A soft type or plasticized polyvinyl chloride composition having been incorporated with appropriate amounts of these additives is preferably used in the present invention to improve moldability of the composition. Plasticizers, stabilizers and other additives for polyvinyl chloride are widely known in this art. Examples of the plasticizer includes phthalic esters such as dibutyl phthalate (DBP), di-n-octyl phthalate (DnOP), di-(2-ethylhexyl) phthalate (DOP) and dinonyl phthalate (DNP), sebacic esters such as di(2-ethylhexyl) sebacate (DOS), adipic esters such as di-(2-ethylhexyl) adipate, phosphoric esters such as tricresyl phosphate (TCP), polyethyleneglycol esters, and epoxy compounds such as epoxyfatty acid esters. The use of DOP or the epoxy compounds is preferable. Stabilizers include thermal stabilizers and UV-absorbing agents. Illustrative of such stabilizers are, for example, stearates such as lead stearate, zinc stearate and barium stearate, epoxy soybean oil, 2,2'-thiodiethyl-bis-[3-(3,5-di-tert-butyl-4-hydroxyphenyl)] propionate, Tinuvin (Ciba-Geigy, UV-absorbing agents of benzotriazole series) and Viosorb (Kyodo Seihin Co.). These stabilizers are commercially available and are incorporated in amounts generally recommened into pólyvinyl chloride. If desired, such polyvinyl chloride composition may further be incorporated with a small amount of a pigment or dyestuff and/or a filler such as carbon black. The composition may further be incorporated with a small proportion of other resins such as ABS resin. Further, polyvinyl chloride may be derived from a predominant proportion of vinyl chloride and a slight proportion of other vinyl monomers copolymerizable therewith, such as vinyl acetate.

Aluminum powders utilizable for the present invention should be in the form of plate and have a diameter of at least 10μ. If the aluminum powders used are smaller than 10μ in diameter, a molded article obtained from a polyvinyl chloride composition containing such aluminum powders will form crack, crazing, spots and the like undesirable fault and tend to deteriorate metallic tone or luster. If the aluminum powders are not in the form of plate, the molded article will also tend to deteriorate metallic appearance. Such platelet aluminum powders of at least 10μ in diameter should be used in an amount of 0.2–10 parts by weight per 100 parts by weight of the polyvinyl chloride. If the proportion of the aluminum powders is less than 0.2 part by weight, the molded article will not be furnished with expected metallic appearance. On the other hand, if the proportion of the aluminum powders is larger than 10 parts by weight, the molded article will form crack, crazing, spots and the like fault. The aluminum powders may optionally be incorporated with a trace amount of other metals or alloys such as copper powders or brass powders to modify the metallic tone or appearance. The aluminum powders are kneaded with polyvinyl chloride or a composition thereof according to a method known per se to form a moldable polyvinyl chloride composition. The polyvinyl chloride composition thus prepared can be molded by injection molding, extrusion, calendering and other suitable molding means to form a molded resinous article with metallic appearance having excellent resistance to weathering action.

A molded polyvinyl chloride article obtained from the composition of the present invention has durable metallic luster and strong resistance against weathering action, chemicals and water. Thus, the molded article possessing high resistance to external influence and decorative effects represented by metallic luster is especially useful as parts of motor vehicles and houses exposed under severe weathering action. Besides these applications, the molded article also finds usefulness as indoor and outdoor ornaments. The polyvinyl chloride composition of the present invention affords such metallized molded article simply by molding without necessity of applying sputtering or the like tremendous metallizing treatment to a molded article, thus achieving great economical advantages.

The present invention will now be illustrated in more detail by way of examples and comparative examples.

A polyvinyl chloride composition consisting of 1000 parts by weight of NIPOLIT SH (polyvinyl chloride, $\overline{P}=1430$; Chisso Petrochemical Corp., Japan), 40 parts by weight of DOP as a plasticizer, 1.5 parts by weight of barium stearate, 0.5 part by weight of zinc stearate and 3.0 parts by weight of epoxy soybean oil as thermal stabilizers, and 0.2 part by weight of Viosorb 130 (UV-absorbing agent, Kyodo Seihin Co., Japan) was incorporated with 0.5 or 2.0 parts by weight of various platelet aluminum powders (different in diameter) shown in Table 1, kneaded with rolls (5 min., 160° C.) and then pressed (160° C., 100 kg/cm$^2$, 3 min.) to form a molded article in the form of a sheet having a thickness of 2 mm as a test piece.

Each test piece was attached to an exposure platform positioned in accordance with the regulations of ISO-R105-1959 in Urazoe city, Okinawa prefecture and exposed for 3 years to weathering action. The test pieces were then recovered, measured for color difference and subjected to appearance inspection by visual evaluation. A result of the measurement and evaluation is shown in Table 1.

The diameter of the platelet aluminum powders used in this experiment was measured according to the following process:

(1) The powders were photographed by a scanning electron microscope of 500 magnifications.

(2) On the photograph taken, an area where the particles exist in dense without forming any space is framed in a rectangle of 30 mm in width and 50 mm in length (corresponding to 600μ and 1000μ, respectively, in real size).

(3) When the diameters of the particles were obviously irregular, the diameters were measured in the order of size. When the area of the particles measured exceeded 80% of of the area of the frame (600μ×1000μ), an average diameter of them was designated.

(4) When the diameters of the particles were even but they were too small to perform the step (2) above described, the diameter of 100 particles were measured at random and an average value thereof was designated.

(5) In both cases of the above described (3) and (4), the diameters of the particles were measured on the photograph by calipers and the measured values were divided by 500 (magnifications).

A preferable range of the diameter of the aluminum powders is from 10 to 100μ. A preferable range of the amount of the aluminum powders to be dispersed in the polyvinyl chloride is from 0.2 to 8 parts by weight per 100 parts by weight of the polyvinyl chloride.

are regarded important, and are commercially valuable in providing molded articles having excellent lustrously metallic appearance and weather-resisting property.

It is understood that the preceding representative examples may be varied within the scope of the present invention, both as to the components and conditions, by those skilled in the art to achieve essentially the same results.

As many apparently widely different embodiments of the present invention may be made without departing from the spirit and scope thereof, it is to be construed that the present invention is not limited to the specific embodiments thereof except as defined in the appended claims.

What is claimed is:

1. A weather-resistant resinous molded article having a metallic luster appearance molded from a polyvinyl chloride composition comprising polyvinyl chloride having dispersed therein platelet aluminum powder, in which the aluminum powder has a diameter of at least 10μ and is present in an amount of 0.2–10 parts by weight per 100 parts by weight of the polyvinyl chloride.

2. A polyvinyl chloride composition according to

TABLE 1

| *¹Amount of Aluminum added (phr) | Results of Measurements | Experiments ||||||||||||||||
| | | Example |||||||||| Comparative Example |||||||
| | | 1 | 2 | 3 | 4 | 5 | 6 | 7 | 8 | 9 | 10 | 11 | 12 | 13 | 14 | 15 | 16 | 17 |
| | | Diameter of Aluminum powders (μ) |||||||||||||||||
| | | 62.3 | 58.4 | 49.0 | 40.2 | 25.2 | 20.9 | 15.7 | 15.4 | 10.3 | 6.4 | 4.3 | 3.5 | 3.0 | 2.9 | 1.9 | 1.8 | 0.6 |
| 0.5 | *²Color Difference (ΔE*) | 3.1 | 3.4 | 3.4 | 3.5 | 3.4 | 3.1 | 4.1 | 2.8 | 5.6 | 9.8 | 11.2 | 13.4 | 18.9 | 10.0 | 15.3 | 16.2 | 21.4 |
| | *³Visual Evaluation | O | O | O | O | O | O | O | O | O | X | X | X | X | X | X | X | X |
| 2.0 | *²Color Difference (ΔE*) | 2.6 | 4.7 | 3.3 | 1.8 | 3.5 | 6.4 | 4.5 | 1.9 | 5.2 | 7.8 | 13.3 | 11.2 | 13.6 | 20.6 | 17.1 | 14.3 | 17.6 |
| | *³Visual Evaluation | O | O | O | O | O | O | O | O | O | O | X | X | X | X | X | X | X |

*¹Parts by weight per 100 parts by weight of polyvinyl chloride
*²Measured by Hitachi Color Analyzer Model 607 according to an equation for color difference [CIE(1979)]
*³The symbol O shows the case of no or a little change in appearance such as a phenomenon of cracks, crazing, spots and/or bleeding, fading of metallic tone, or degradation of luster, while the symbol X shows the case wherein such change is observed.

As is evident from the table, the polyvinyl chloride composition of the present invention affords a molded article having significantly excellent metallic appearance and durability in comparison with the cases wherein the size and proportion of the aluminum powders are outside the ramges defined. Such a remarkable technical effect is quite unexpected from the teachings in the prior art references.

The polyvinyl chloride composition of the present invention thus fully satisfies the needs in design of exterior parts for motor vehicles where protection moldings claim 1, wherein the platelet aluminum powder has a diameter of 10–100 microns.

3. A polyvinyl chloride composition according to claim 1, wherein the platelet aluminum powder is used in an amount of 0.2–8 parts by weight per 100 parts of the polyvinyl chloride.

4. A polyvinyl chloride composition according to claim 1, wherein the composition also contains a plasticizer, a stabilizer and a UV-absorbing agent.

* * * * *